Figure 1:
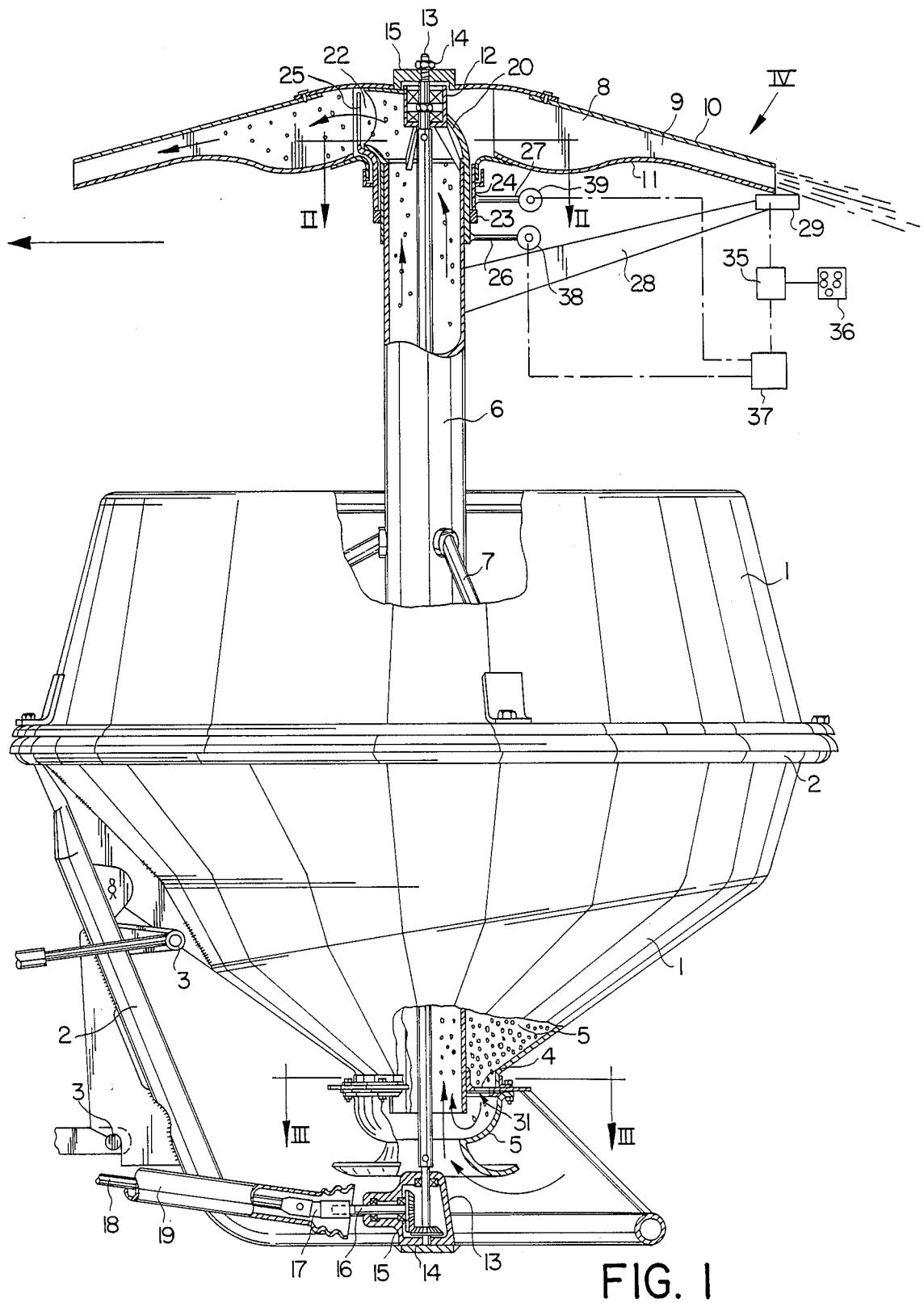

United States Patent [19]

Wondergem

[11] Patent Number: 4,874,130

[45] Date of Patent: Oct. 17, 1989

[54] DEVICE FOR DISTRIBUTING A GRANULAR OR POWDERY SUBSTANCE

[75] Inventor: Jan Wondergem, Rijsenhout, Netherlands

[73] Assignee: Multinorm B.V., Netherlands

[21] Appl. No.: 65,588

[22] Filed: Jun. 23, 1987

[30] Foreign Application Priority Data

Jun. 23, 1986 [NL] Netherlands .................... 8601629

[51] Int. Cl.⁴ .................. A01C 15/14; A01C 17/00
[52] U.S. Cl. ..................................... 239/63; 239/665; 239/687; 406/162
[58] Field of Search .............. 239/63, 654, 655, 665, 239/668, 681, 684, 687; 406/99, 100, 162

[56] References Cited

U.S. PATENT DOCUMENTS

| | | | |
|---|---|---|---|
| 396,251 | 1/1889 | Adanson | 239/681 X |
| 1,253,672 | 1/1918 | Decker | 239/654 |
| 1,644,031 | 10/1927 | Pulliam | 239/666 X |
| 2,157,630 | 5/1935 | Root . | |
| 2,758,842 | 8/1956 | Buroff | 239/675 X |
| 2,923,574 | 2/1960 | Fuss et al. | 239/655 X |
| 3,156,473 | 11/1964 | De Beasi | 239/687 X |
| 3,165,859 | 1/1965 | Valdrum | 239/681 X |
| 3,227,461 | 1/1966 | Love | 239/687 X |
| 4,300,725 | 11/1981 | Moherek | 239/684 |

FOREIGN PATENT DOCUMENTS

| | | | |
|---|---|---|---|
| 61335 | 9/1982 | European Pat. Off. . | |
| 251401 | 1/1988 | European Pat. Off. | 239/654 |
| 3446311 | 6/1986 | Fed. Rep. of Germany | 239/654 |
| 1554609 | 1/1967 | France . | |
| 1498719 | 9/1967 | France . | |
| 2001923 | 1/1969 | France . | |
| 2036252 | 12/1970 | France . | |
| 677702 | 8/1979 | U.S.S.R. | 239/654 |
| 880305 | 11/1981 | U.S.S.R. | 239/654 |

Primary Examiner—Andres Kashnikow
Assistant Examiner—Kevin P. Weldon
Attorney, Agent, or Firm—John P. Snyder

[57] ABSTRACT

A device for overhead dusting of a field with fertilizer or particulate material includes an overhead suction impeller having a central annulus receiving a vertical pipe leading from a flow-controlled hoppr discharge. A cover on the pipe confines the discharge of air and entrained material to an angular section of the annulus and a baffle is adjustable around the pipe to increase and decrease the angular section.

16 Claims, 4 Drawing Sheets

DEVICE FOR DISTRIBUTING A GRANULAR OR POWDERY SUBSTANCE

The invention relates to a device for distributing a granular or powdery substance such as fertilizer, which device consists substantially of a storage holder for this substance having an outflow opening and one or more driven distributor members connected to this outflow opening.

Such a device is known in many embodiments, whereby ordinarily the distributor member connects directly onto the outflow opening usually located on the underside of the storage holder, and this distributor member can be a spray nozzle driven for reciprocal swinging as well as an oscillating wheel. The drawback to such devices is that the distributor member lies relatively close to the ground, whereby the width of spread which can be achieved remains limited. A solution has been found in mounting the distributor member higher up, that is, at a level higher than the outflow opening of the storage holder. This demands additional transporting means. Such a proposal is described in the U.S. Pat. No. 4,561,596, whereby a jack is employed as transporting means. Such a jack causes the problem that the housing fitted around it can become blocked, and the substance in the jack can be crushed, whereby the further drawback emerges that, each time after the drive of the device has been stopped, for example because a turn has to be made in the field, the transporting of the substance is difficult to get re-started.

The invention has for its purpose to obviate the above stated drawbacks and provides to this end a device which is distinguished in that arranged between the outflow opening and each distributor member is a guide tube, whereby means are present for generating an air flow from the one and located at the outflow opening to the other end of the tube.

Owing to the use of an air flow to carry the substance for distribution, a free choice of the tube configuration can be made. It can easily include bends, for the purpose of placing the distributor members relative to the storage holder where they are most effective. The use of an air flow also offers the advantage that after stopping the supply of fresh material the guide tubes can be completely blown clean, this in contrast to the known transport jacks.

In a preferred embodiment the means generating the air flow are formed by a blade wheel at the other end of the tube. This results in a suction action in the guide tube which prevents loss of material and blockage.

In accordance with a further proposal of the invention the other end of the guide tube comprises one or more sideways directed through-feed openings, whereby the blade wheel is arranged for concentric rotation round that end and these through-feed openings. In this embodiment the blade wheel is therefore also used as distributor member, since the material for distribution that is fed directly into the centre of the blade wheel is thrown outward and distributed by these same blades.

It is recommended in this embodiment that the width of the or each through-feed opening be regulated by means of a partition which can rotate concentrically round the tube. In this way the width of the spreading pattern is determined.

In a further embodiment the through-feed opening can be adjusted for rotation relative to the longitudinal tube axis so that the position of the pattern of spread can thereby be determined. This is of importance when distributing substances of a different nature from one another.

A particularly uniform feeding of the substance for distribution out of the storage holder to the guide tube is ensured by concentric accommodation of the one end of the tube in the outflow opening of the storage holder and by preferably making the passage of this outflow opening adjustable.

By completely closing off the passage the distribution process can be stopped entirely without loss of material, after which the process can easily be started by opening the passage, since the transporting air flow can be maintained.

The invention is explained further with reference to the following figure description of an embodiment.

Figure 2:
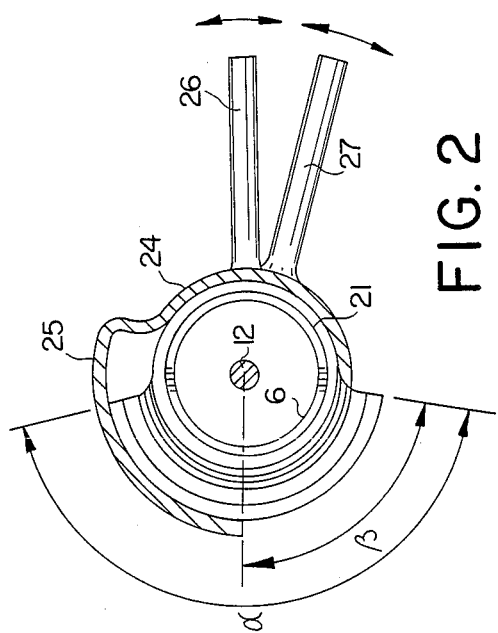
Figure 3:
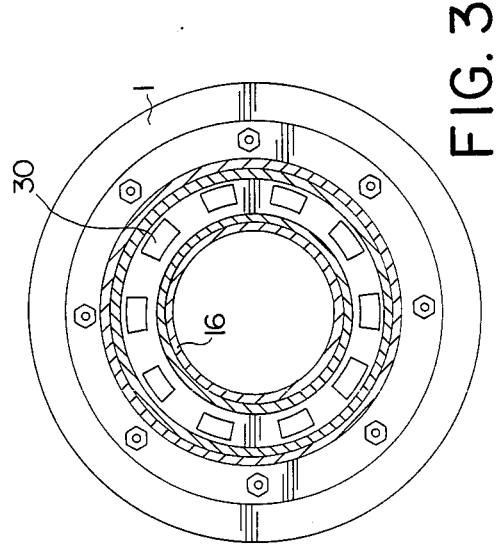
Figure 4:
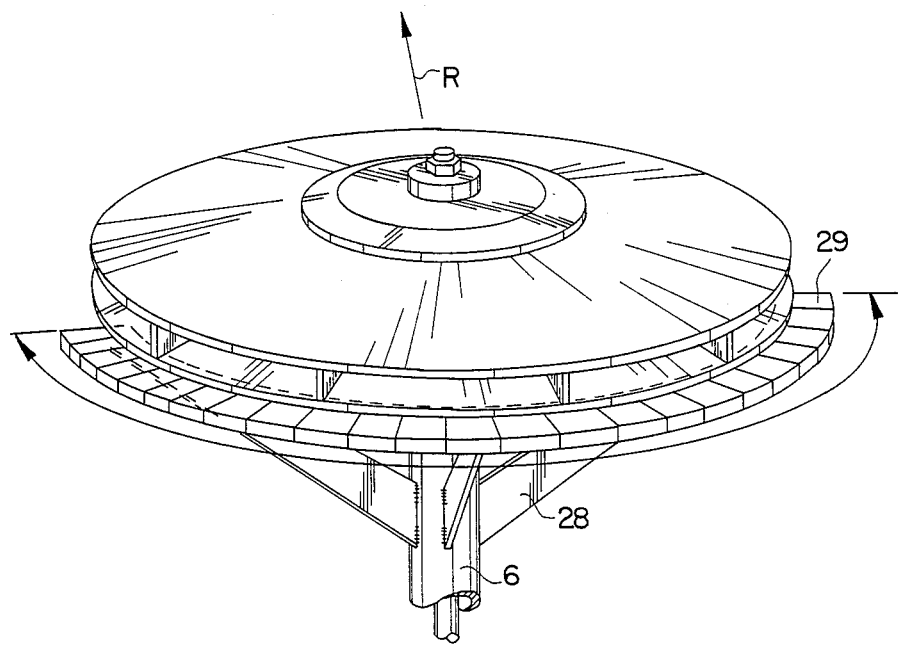
Figure 5:
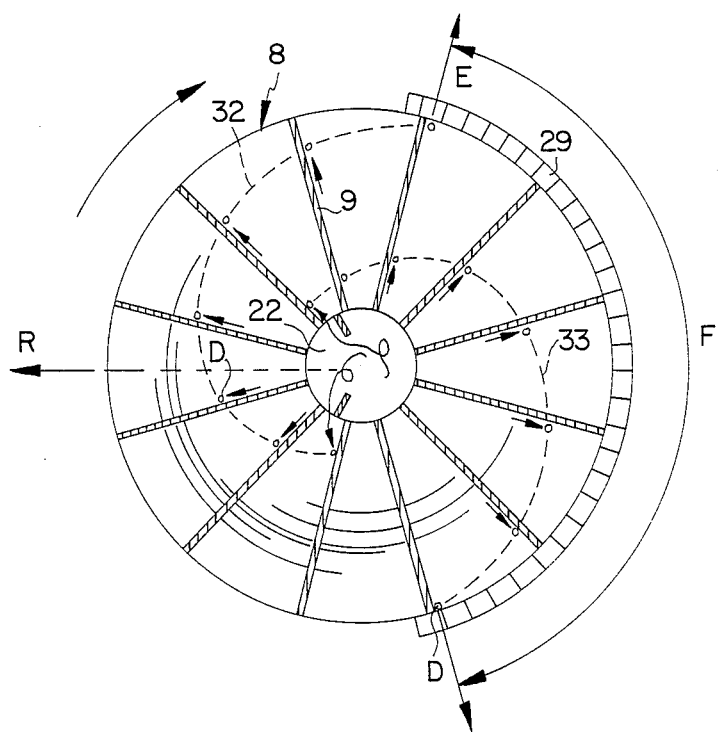

In the drawing:

FIG. 1 shows an upright side view with partially broken away portions of an embodiment of the distributing device according to the invention, FIG. 2 is a top view along the line II—II in FIG. 1, FIG. 3 shows a top view along the line III—III in FIG. 1, FIG. 4 is a perspective top view of the blade wheel as according to the arrow IV in FIG. 1, and FIG. 5 shows a schematic top view of the blade wheel from FIG. 4.

Figure 6:
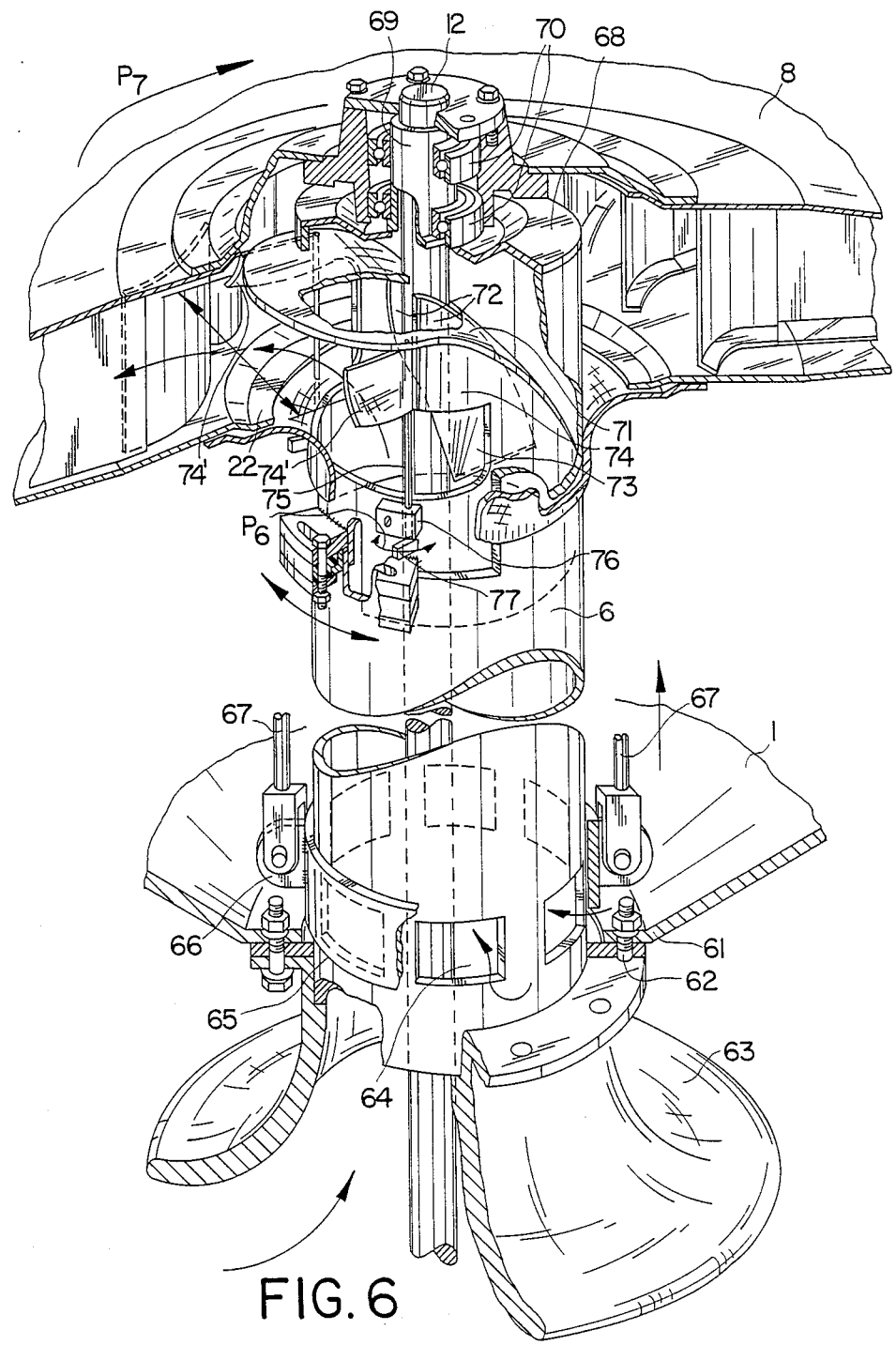

FIG. 6 shows a perspective top view of the blade wheel and guide tube according to a further embodiment of the invention.

The device shown in FIG. 1 consists of a storage holder 1 for a substance S stored therein, which substance can be a fertilizer, which has to be distributed over land. For this purpose the holder is supported via a frame 2 manufactured from tubular material, this frame being carried by means of a coupling mechanism 3 on the three-point suspension lifting device of an agricultural tractor (not shown).

The storage holder 1 has on the underside an outflow opening 4 which can be closed off, which will be further explained below. Connecting onto the underside of outflow opening 4 is a cup-like body 5, which is open at the bottom, for the supply of transporting air, this being further explained below.

Placed centrally in the middle of storage holder 1 is a guide tube 6, of which the one, lower end emerges into the cup-like body 5. The tube 6 is centralized in the storage holder 1 by means of bracing bars 7.

Arranged on the other, upper end of tube 6 is a distributor member 8 which here has the form of a blade wheel, the blades 9 of which are covered at the top by a conically formed plate 10 and on the underside by a wave shaped plate 11. As a result closed sections having radial inlet and outlet openings are created between the blades 9, se also FIG. 4 and 5.

The blade wheel 8 is non-rotatably attached to the upper end of a drive shaft 12. This attachment is carried out by means of the threaded end 13 and bolt 14 which clamps the central have 15 of the blade wheel onto the upper end of drive shaft 12.

Dive shaft 12 extends over the whole length of tube 6 and is mounted at the bottom in a bearing bush 13 which is accommodated in frame 2. The lower end of the drive shaft is formed with a conical toothed wheel 14 which co-operates with a conical toothed wheel 15. This toothed wheel 15 is attached to a drive shaft stump 16 which is also mounted in the bush 13. Stump 16 is connected via a universal joint 17 to the power take-off 18 of the agricultural tractor (not shown). The power take-off is enclosed by a per se known protective casing 19. The upper end of guide tube 6 carries a cover 20 which has a shaft portion 21 which is close fitting round tube 6 and which can rotate relative to tube 6 concentrically to its longitudinal axis. Cover 20 displays a through-feed opening 22 which extends through a determined circular arc α, see FIG. 2.

Close to the lower end, the shaft 21 of cover 20 bears a ring 23, which serves as support for a second shaft 24, which is fitted for free rotation around the first shaft 21. The shaft 24 bears a curved partition 25 which can be situated in front of the through-feed opening 22 of cover 20, see also FIG. 2. The width β of the through-feed opening 22 can therefore be adjusted with this plate 25. This is facilitated by providing each shaft 21 and 24 with a handle 26 and 27 respectively.

The tube 6 is in addition provided with three radially directed arms 28 on the outer ends of which supports a circular arc strip 29. This strip 29 has a graduation with which it is possible to easily determine visually the width and direction over which the material for distribution is thrown outward.

This strip 29 can if required contain electronic sensors or the like, whereby these values can be assessed at the central tractor drive position.

The outflow opening of storage holder 1 is shown in top view in FIG. 3. This outflow opening is arranged concentrically around tube 6 and consists of passages 30 arranged in a circle, whereby underneath these passages 30 is located a rotary ring 31 having a corresponding number of passages in the same pattern. By rotating this ring in a manner that is not shown but nevertheless known the passages 30 of outflow opening 4 can be more or less closed off.

The above described device operates as follows:

As soon as drive shaft 12 is set into rotation via power take-off 18 the distributor member 8 will begin to rotate, as a result of which an air flow is generated through the riser pipe 6, this air flow passing via the opening 22 into the sections between blades 9 and to the outside.

As soon as the storage holder 1 is filled with a substance for distribution, which may be granular or in powder form, this substance will fall down into the cup-like body when the passages 30 are opened by means of the appropriate rotation of the ring 31. The air flow generated in the meantime through guide tube 6 carries this substance upward with it and feeds the substance through thh through-feed opening 22, after which the particles are carried away by the blades 9, see FIG. 5. A particle D is indicated here at each subsequent blade 9, but it is assumed hereby that the particle moves along such a blade in a spiral-shaped path 32. The path ends for a particle at E if this particle arrived on the blade wheel 8 at the furthest left-hand limit of through-feed opening 22. Another particle at the right-hand limit of through-feed opening 22 will leave the wheel at D following the path 33, which explains why a particular width of through-feed opening 22 determines a particular width of spread F in FIG. 5.

This width of spread F can be decreased by closing off the through-feed opening 22 to a greater or lesser extent using the dosage plate 25, see FIG. 2.

In FIG. 5 the central axis of through-feed opening 22 is drawn in the direction of movement R, but it will be apparent that when the through-feed opening 22 is displaced through a determined angle, the location of the width of spread changes relative to the ring 29. The spreading direction can in this way be determined.

It is therefore possible with the above described device to not only set easily the width of spread but also the direction of spread by means of the handles 26 and 27, the adjustment of which can also be performed mechanically.

The gauge ring 29 can determine the required width and direction of spread using sensors, these sensors controlling for example the operation of the arms 26, 27 via the control scheme in FIG. 1. The control scheme is a calculator unit 35 which receives as input the signals from the sensors 29 and the set-up panel 36. The calculator unit 35 controls a regulating unit 37 which controls the two adjusting motors 38, 39 for each of the arms 36, 37.

In FIG. 6 a further embodiment of the invention will be explained. In the drawing the same reference numerals are used for the same part of the distributing device.

It is assumed that the guide tube 6 is concentrically located in the storage holder or hopper 1, whereas the lower flange 61 is provided with holes for screw-bolts 62 for the mounting of a trumpet-like member 63, being part of the guide tube 6. Above the connecting flange 61 of the hopper 1, the guide tube is provided with orifices 64 communicating with the outflow part of the hopper 1, such that the substance S can flow from the hopper 1 through the orifices 64 onto the lower end of the guide tube 6.

Around the lower end of the guide tube 6 an annular member 65 is adapted to be slided in up- and downwards direction, said member having ears 66 for connecting control rods 67, which will extend to the topside of the storage holder 1, in order to be able to full the rods upwardly or push them downwardly. In correspondence with said movement the annular member 65 will be slided into a position, wherein the orifices 64 are partly or wholly covered by the member 65, so determining the rate of throughflow of the substance into the guide tube.

It will be clear that the way of regulating the control rods 67 can be done in any suitable way, including a manually or mechanically manner.

The other or top end of the guide tube 6 is provided with a through-feed opening 22, formed by cutting away the side-wall of the guide tube 6 over a certain axially and radially distance. The top face of the tube 6 is closed off by a top plate 68, being a support for a bearing hub 69 for bearing the driving shaft 12. The driving shaft 12 is fixedly connected to the blade wheel 8. The blade wheel itself is supported by ball bearings 70, mounted in any suitable way on the central hub 69.

Underneath the cover plate 68 the top end of the tube 6 is provided with guiding means for guiding the particles to be distributed. The guide means are formed by a curved plate 71, which from the bottom to the top starts from the side of the tube opposite the through-feed opening 22, to the top side of said opening 22.

Further partition plates 73 are arranged underneath the curved plate 71 and partly covering the through-flow opening 22 of tube 6. The plate 73 is tube-like and snugly fits into the top end of the tube 6. That tube-like plate 73 together with the curved plate 71 can be rotated with respect to the tube 6, so being able to control the inlet point of the substance to be distributed with respect to the blade wheel 8.

The part 73 is provided with a partition means 74, a part of which is fixed to the part 73, and a part of which 74' is formed like a flap. The flap 74' is fastened to a pin 75, pivitably supported in a block 76. The block is fixedly secured to the part 73. The lower side of the pin 75 is provided with an arm 77 which can be set on one of the positions according to arrow P6. By turning the arm 77 the flap 74' will be turned either, and together with a flap 74' at the opposite side of the through-feed opening 22, said opening can be narrowed or widened, so determining the width of the outflow of the substance before it will be entered into the blade wheel 8.

Furthermore the inner ends of each blade 9 in the blade wheel 8 is curved on to the direction of rotation as given by arrow P7. The curved inner end will guide the flow of substance to be distributed in a better way into the sections of the blade wheel, so diminishing wear.

The working of the embodiment according to FIG. 6 is similar to the working of the embodiment according to FIG. 1, in this sense that the flow of the granular or powdery substance will be carried by the air flow generated by the blade wheel 8. The flow is directed according to arrow P8 from the inlet lower side of the tube 6 up to the top side of the tube 6 where the flow is guided by the curved plate 71, the part 73 and the flaps 74', such that the width of the flow, and the direction, with respect to the blade wheel 8, is optimally performed.

There are other embodiments possible within the framework of the invention. The storage holder 1 does not necessarily have to have one guide tube 6 but can for example have two or more tubes, each of which carries a distributor member on the other end. Nor does the distributor member have to be an oscillating wheel in the form of the blade wheel shown but can also be an oscillating spreader pipe. For generating the required air flow a separate fan can be employed.

It will also be apparent that the guide tube 6 does not have to stand vertically but can assume a position deviating therefrom and can also take a curved form.

I claim:

1. A device for distributing a granular or powdery substance such as fertilizer, comprising a storage holder for this substance having out flow opening means for flowing the substance therethrough, one or more elevated distributor members, a vertically extending guide tube having a lower end communicating with the outflow opening means and an opposite end communicating with each distributor member, means for generating an air flow from the lower end of the guide tube located at said outflow opening means to the opposite end of said tube, and means for controlling flow of the substance through the outflow opening means between open and shut-off conditions, including sensors arranged close to the discharge path of the distributor member for determining the width and direction of spread of the substance for distribution.

2. A device for distributing particulate material from an elevated position over the surface of a field which comprises the combination of storage means for containing a supply of the particulate material and having bottom opening means for controllably discharging the particulate material in a direction to flow directly downwardly onto the surface of a field, means for transporting the device along a path on the field to produce a swath of coverage of the particulate material over the surface of the field, distribution means leading from the bottom opening means of the storage means upwardly to a region of discharge located at the elevated position above the storage means for directing material in a generally horizontal direction at said elevated position to create the swath of coverage, said distribution means comprising a conduit having an open bottom end in communication with ambient air and the bottom opening means of the storage means, and rotatable suction means communicating with the conduit at the elevated position above the the bottom end of the conduit for sucking air to flow from the bottom end of the conduit upwardly through the conduit to pick up particulate material discharging through the bottom opening means and entrain such particulate material in the air flow and discharge the air and material entrained in it at the elevated position to create the swath of coverage, said suction means constituting the sole mechanism for conveying the material to said elevated position.

3. A device as defined in claim 2 wherein the rotatable suction means comprises an impeller having a central inlet opening and a series of uniformly spaced passages leading radially from said central inlet opening and a cover adjustably rotatable with respect to the conduit having a discharge mouth communicating with said central inlet opening only over a first finite angular region of the central inlet opening whereby air with entrained material is discharged peripherally by said passages only over a second finite angular region rotationally displaced from said first finite angular region.

4. A device as defined in claim 3 including direction control means for adjusting said cover rotationally with respect to said conduit.

5. A device as defined in claim 4 including adjustable baffle means for altering the angular width of said first finite angular region.

6. A device as defined in claim 3 including adjustable baffle means for altering the angular width of said first finite angular region.

7. A device for overhead dispensing of a granular or powdery material entrained in air onto the surface of a field, comprising means for traveling the device over the surface of a field, a storage hopper for the material having outflow opening means for discharge of the material and flow control means for controlling the discharge of material through the outflow opening means; suction means for picking up and entraining material discharging from the outflow opening means and drive means for continuously driving the suction means during operation of the device so that the amount of material dispensed is controlled solely by said flow control means; said suction means comprising overhead impeller means having a central inlet for inducting air and passage means for discharging air and any entrained material therein radially from the central inlet, a vertically extending tube having a lower end communicating with ambient air and the outflow opening means to pick up ambient air and entrain material discharging through the outflow opening means, and having an upper end communicating with said central inlet; and said drive means including a drive shaft connected to said impeller means.

8. A device as defined in claim 7 including cover means on the upper end of the tube for confining communication of air and any entrained material to a finite angular region of the central inlet, less than circumferential, so that the discharge of such air and any entrained material from the periphery of the impeller means is likewise confined to a finite angular region rotationally displaced from the finite angular region of the central inlet.

9. A device as defined in claim 8 including baffle means for adjusting the finite angular region of the central inlet with which the cover means communicates.

10. A device as defined in claim 8 including direction control means for rotatably adjusting the cover means relative to the tube whereby to control the rotational direction of said finite angular region of the central inlet and the consequent direction of the discharge of air and any entrained material from the impeller means relative to the device.

11. A device as defined in claim 9 including direction control means for rotatably adjusting the cover means relative to the tube whereby the control the relative position of said finite angular region of the central inlet and the consequent direction of the discharge of air and any entrained material from the impeller means relative to the device.

12. A device as defined in claim 7 wherein said tube is substantially vertical and projects completely through the storage holder.

13. A device as defined in claim 12 wherein said drive shaft projects coaxially through the tube and said drive means includes transmission mechanism below the lower end of the tube and connected to the drive shaft.

14. A device as defined in claim 7 wherein said central inlet defines an annulus and the upper end of the tube communicates only with an angular fraction of the annulus so that air and any entrained material is discharged over only a fraction of the periphery swept by the passage means.

15. A device as defined in claim 14 including direction control means for adjustably locating the angular fraction relative to the direction in which the device is traveling.

16. A device as defined in claim 15 including means for increasing and decreasing the angularity of said angular fraction.

* * * * *